United States Patent Office 2,960,474
Patented Nov. 15, 1960

2,960,474

SILICATE-SILICONE HYDRAULIC FLUID COMPOSITION

Neal W. Furby and Charles D. Newnan, Berkeley, Calif., assignors to California Research Corporation, San Francisco, Calif., a corporation of Delaware No Drawing. Filed May 20, 1957, Ser. No. 660,055

7 Claims. (Cl. 252—78)

The present invention relates to the preparation of novel compositions useful as hydraulic fluids. More particularly, the invention has to do with the preparation of such compositions based on certain organo-silicon compounds as essential ingredients. This application is a continuation-in-part of application Serial No. 377,240, filed August 28, 1953, now abandoned, which in turn is a continuation-in-part of application Serial No. 215,638, filed March 14, 1951, now abandoned.

In general, a suitable hydraulic fluid is required to have certain properties, such as good wear characteristics in the lubrication of moving parts of hydraulic systems; oxidation-corrosion stability; good volatility characteristics; compatibility with the seals employed in the hydraulic system; resistance to fire; good shear characteristics, that is, retention of body and viscosity when subjected to the shearing action of hydraulic pumps and when passing through small openings or orifices at high pressure; and most importantly, a good viscosity-temperature relationship, that is, small change in viscosity over a wide temperature range, such as is encountered, for example, in the operation of aircraft. Other additional requirements of a suitable hydraulic fluid are ease of handling, non-toxicity, etc.

The fluids heretofore proposed as hydraulic fluids, while possessing one or more of the aforesaid desired properties, are lacking in one or more other properties or do not possess the desired properties to an extent regarded as satisfactory. Hydraulic fluids based on mineral oils, for example, have heretofore been extensively used. Such fluids have certain desirable characteristics, for example, good lubricating properties, but are deficient in other respects, for example, generally inferior viscosity-temperature characteristics, etc.

We have discovered that hydraulic fluids based on a blend of an alkyl silicone and a disilicate possess all the desirable attributes enumerated above, and have excellent temperature-viscosity characteristics. Moreover, the fluids prepared in accordance with the invention admit the incorporation of additives which impart to the final fluid additional desirable properties or improve those already possessed by the blend. Compositions heretofore proposed as hydraulic fluids are generally not only inferior from a viscosity-temperature standpoint, but those that may have a satisfactory viscosity-temperature relationship are deficient in that they do not permit the incorporation of agents to improve one or more of the properties of the fluid. In addition, we have found that our fluids have superior volatility characteristics; that is, as compared with other fluids of like viscosity, our fluids are less volatile, as a result of which evaporation losses are reduced, as is the formation of heavy residues which adversely affect viscosity, lubricity, etc.

In brief, the fluid compositions of the present invention are made up of a total of from about 85 to 97% by weight of alkyl silicate selected from the group consisting of hexaalkyl disilicates and mixtures of alkyl silicates which are predominantly hexaalkyl disilicate, together with from about 3 to 15% by weight of a dialkyl silicone polymer.

The alkyl silicate component of the blend can be described as one having the general formula

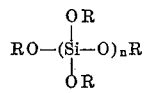

where $n$ is an integer having a value of 2 or, in the case of mixtures of alkyl silicates, with $n$ having values of 1, 2 and higher but predominantly 2, and where the R's, which may be the same as or different from one another, represent alkyl groups of from 1 to about 18 carbon atoms each. Preferably, however, each of the R's represents a branched-chain alkyl group of from 5 to 8 carbon atoms, the branched radicals herein referred to being those derived from secondary or tertiary alcohols, or from primary alcohols wherein branching occurs in the 2-position.

Specific examples of tetraalkyl silicate esters, hexaalkyl disilicate esters and higher polyalkyl polysilicate esters contemplated by the invention in the alkyl silicate component of the blend are tetraethyl silicate, tetra-(2-butyl) silicate, hexa(n-butyl) disilicate, tetra(n-octyl) silicate, as well as those silicates having the preferred structure indicated above, such as tetra(2-methyl-1-butyl) silicate, tetra(2-methyl-2-butyl) silicate, tetra(n-hexyl) silicate, tetra(2-hexyl) silicate, tetra(2-ethyl-1-butyl) silicate, tetra(2-heptyl) silicate, tetra(2-octyl) silicate, and tetra(2-ethyl-1-hexyl) silicate, as well as the corresponding hexaalkyl disilicates, octaalkyl trisilicates, decaalkyl tetrasilicates, etc.

The mixtures of alkyl silicates contain any proportions of the various tetraalkyl silicate, hexaalkyl silicate, octaalkyl trisilicate, etc., as described above, so long as the hexaalkyl disilicate is predominantly present. This means for the purpose of this description that the hexaalkyl disilicate is present in the mixture of alkyl silicates in the greatest amount. It is generally desirable to have at least 50% and preferably at least 60% by weight of hexaalkyl disilicate in the alkyl silicate mixture for the best viscosity characteristics of the final blend of alkyl silicate and dialkyl silicone polymer.

Suitable mixtures of alkyl silicates, in addition to the hexaalkyl disilicate, also contain up to 10% tetraalkyl silicate, up to 15% octaalkyl trisilicate, and up to 25% higher polyalkyl polysilicates as described above. A particularly satisfactory mixture of alkylsilicates is one having the composition:

| | Percent by weight |
|---|---|
| Tetraalkyl silicate | 5 |
| Hexaalkyl disilicate | 70 |
| Octaalkyl trisilicate | 10 |
| Higher polyalkyl polysilicates | 15 |
| | 100 |

In summation, the alkyl silicate component of the blend of alkyl silicate and dialkyl silicone polymer, according to this invention, is seen from the foregoing to have the overall composition:

| | Percent by weight |
|---|---|
| Tetraalkyl silicate | 0 to 10 |
| Hexaalkyl disilicate | 50 to 100 |
| Octaalkyl trisilicate | 0 to 15 |
| Higher polyalkyl polysilicates | 0 to 25 |

In one embodiment of the alkyl silicate component, the hexaalkyl disilicate is present alone or 100% by weight. In another embodiment illustrating the mixtures of alkyl silicates, the hexaalkyl silicate is present in the amount of only 50% by weight along with 10% by weight of tetraalkyl silicate, 15% by weight of octaalkyl trisilicate and 25% by weight of mixed higher polyalkyl polysilicate.

Suitable mixed alkyl silicate components of the type described above are readily obtained by simply mixing the alkyl silicates together to provide a synthetic mixture. The mixed alkyl silicate components are also conveniently obtained as reaction products such as, for example, the reaction products obtained by reacting a silicon tetrahalide such as silicon tetrachloride with an appropriate aliphatic monohydric alcohol. The various individual higher polyalkyl polysilicates in these reaction products in minor amounts contain as high as 10 or more dialkoxy siloxy units as noted in the general formula above. Such reactions are ordinarily carried out in the presence of water for hydrolysis and an acid acceptor such as pyridine to remove the hydrogen halide formed in the reaction. By simply controlling the proportions of alcohol, silicon tetrahalide and the amount of water according to the following equations, and distilling to remove undesired low boiling materials, suitable mixtures of alkylsilicates of the desired types as discussed above are obtained.

I. FIRST PHASE (1)   $1SiX_4 + 1ROH \rightarrow ROSiX_3 + HX$
(2)   $1SiX_4 + 2ROH \rightarrow (RO)_2SiX_2 + 2HX$
(3)   $1SiX_4 + 3ROH \rightarrow (RO)_3SiX + 3HX$
(4)   $1SiX_4 + 4ROH \rightarrow (RO)_4Si + 4HX$ In the above reactions of the first phase, R is an alkyl group as previously described and X is halogen. The dialkoxy dihalosilane and trialkoxy halosilane are ordinarily produced predominantly and only minor amounts of the other products result.

II. SECOND PHASE (1)
$$(RO)_3SiX + HOH + XSi(OR)_3 \xrightarrow{\text{acid aceptor}}$$
$$(RO)_3SiOSi(OR)_3 + 2HX \cdot \text{acid acceptor salt}$$
Disilicate (2)
$$(RO)_3SiX + HOH + X - \underset{\underset{OR}{|}}{\overset{\overset{OR}{|}}{Si}} - X + HOH + XSi(OR)_3 \xrightarrow{\text{acid acceptor}}$$
$$(RO)_3SiO\underset{\underset{OR}{|}}{\overset{\overset{OR}{|}}{Si}}OSi(OR)_3 + 4HX \cdot \text{acid acceptor salt}$$
trisilicate (3)
$$2(RO)_3SiX + 3H_2O + 2(RO)_2SiX_2 \xrightarrow{\text{acid acceptor}}$$
$$(RO)_3SiO\underset{\underset{OR}{|}}{\overset{\overset{OR}{|}}{Si}}O\underset{\underset{OR}{|}}{\overset{\overset{OR}{|}}{Si}}OSi(OR)_3 + 6HX \cdot \text{acid acceptor salt}$$
tetrasilicate R and X in the above equations are the same as previously mentioned.

The polyalkyl polysilicate components of the compositions of this invention are also commonly known by their accepted terminology as polyalkoxy polysiloxanes. For example, the hexaalkyl disilicates are known as hexaalkoxy disiloxanes, the octaalkyl trisilicates are known as octaalkoxy trisiloxanes and similar terms are applied to the higher polyalkyl polysilicates.

The alkyl silicone polymer component of the blend of the present invention can be represented by the general formula

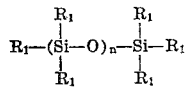

where $n$ is an integer having a value of at least one and wherein the $R_1$'s are lower alkyl radicals of from 1 to 5 carbon atoms each. Said silicone polymer is one which has a viscosity of at least 1,000 cs., as measured at 77° F., and which may have a viscosity as high as 10,000,000 or more cs. at 77° F. Preferably, the silicone component of the present blend is one having a viscosity between about 60,000 and 2,500,000 cs. at 77° F. Said silicone polymers may be of either branched or straight-chain configuration, and they may also incorporate various cross-linkages, all as is clearly understood in the silicone art, always provided that the silicone polymer be one which is soluble in the alkyl silicate component of the blend to the extent of at least 3% by weight. Representative silicone polymers are dimethyl silicone, diethyl silicone, methylethyl silicone, dipropyl silicone, dibutyl silicone and diamyl silicone.

The following examples illustrate compositions prepared in accordance with the invention.

*Example 1*

About 5 parts of dimethyl silicone having a viscosity of about 1,000,000 centistokes at 77° F. was mixed with about 95 parts of hexa(2-methyl-1-butoxy) disiloxane, the parts being by weight. The resulting composition had an ASTM slope of 0.33, and the following viscosities:

| Temperature, ° F.: | Centistokes |
|---|---|
| −65 | 706 |
| −40 | 275 |
| 100 | 26.2 |
| 130 | 19.8 |
| 210 | 11.0 |

*Example 2*

A composition was made up of about 6 parts of diethyl silicone having a viscosity of about 80,000 centistokes at 77° F., and 94 parts of hexa(2-ethyl-1-butoxy) disiloxane, the parts being by weight. The final composition had an ASTM slope of 0.42 and the following viscosities:

| Temperature, ° F.: | Centistokes |
|---|---|
| −65 | 1,520 |
| −40 | 410 |
| 100 | 23.4 |
| 130 | 16.7 |
| 210 | 8.16 |

*Example 3*

In this operation there was followed the same procedure as described above in connection with Example 2. Here, however, there was used 6% of a diethyl silicone having a viscosity of 200,000 cs. at 77° F. The final composition had an ASTM slope of 0.39 and the following viscosities:

| Temperature, ° F.: | Centistokes |
|---|---|
| −65 | 1,816 |
| 100 | 27.5 |
| 130 | 19.65 |
| 210 | 9.68 |

*Example 4*

A composition was made up of about 8 parts of methylethyl silicone having a viscosity of 136,000 cs. at 77° F., together with 92 parts of hexa(2-ethylbutoxy) disiloxane. The final composition had an ASTM slope of 0.386 and manifested the following viscosities:

| Temperature, ° F.: | Centistokes |
|---|---|
| −65 | 2,130 |
| 100 | 40.3 |
| 210 | 14.7 |

*Example 5*

A composition was made up of about 10 parts of methylethyl silicone having a viscosity of 136,000 cs. at 77° F. together with 90 parts of hexa(2-ethylhexoxy)

disiloxane. The resulting blend had an ASTM slope of 0.39, and it manifested the following viscosities:

| Temperature, °F.: | Centistokes |
|---|---|
| −40 | 2,256 |
| 100 | 63.9 |
| 210 | 21.0 |

*Example 6*

In this operation there was repeated the procedure of Example 5, except that here the amounts of silicone and disilicate were 6% and 94%, respectively. This blend had an ASTM slope of 0.59, and its viscosity was as follows:

| Temperature, °F.: | Centistokes |
|---|---|
| −40 | 1,460 |
| 100 | 34.6 |
| 210 | 11.17 |

*Example 7*

Eight parts of methylethyl silicone having a viscosity of 100,000 to 120,000 centistokes at 77° F. was combined with 92 parts of hexa(2-ethylbutoxy) disiloxane mixture having the following analysis:

| | Percent by weight |
|---|---|
| Tetra(2-ethylbutoxy)ortho-silicate | 5 |
| Hexa(2-ethylbutoxy)disiloxane | 70 |
| Octo(2-ethylbutoxy)trisiloxane | 10 |
| Higher boiling polyalkoxy polysiloxanes | 15 |

The blend had an ASTM slope of 0.38 and the following viscosity temperature characteristics:

| Temperature, °F.: | Centistokes |
|---|---|
| −65 | 2,490 |
| 100 | 34.4 |
| 210 | 11.78 |

The fluid compositions of the present invention containing hexaalkyl disilicates or mixtures of alkyl silicates which are predominantly hexaalkyl disilicate possess superior viscosity temperature characteristics compared to similar silicate and silicone blends which do not contain the hexaalkyl disilicates. In illustration of this attribute of the present compositions, the following table of viscosity measurements gives a comparison of a diethyl silicone-thickened tetra(2-ethyl-1-hexyl) silicate with a similar type diethyl silicone-thickened hexyl(2-ethyl-1-butoxy)disiloxane.

TABLE

| Composition | Viscosity (Centistokes) | | | |
|---|---|---|---|---|
| | −65° F. | 100° F. | 210° F. | ASTM Slope |
| I. Diethyl silicone (9%) | 9,500,000 | 200,000 | 46,000 | 0.15 |
| Tetra(2-ethyl-1-hexyl) silicates (91%) | 1,320 | 6.83 | 2.36 | 0.68 |
| Blend | 5,535 | 31.8 | 21.6 | 0.42 |
| II. Diethyl silicone (6%) | 4,400,000 | 130,000 | 30,000 | 0.15 |
| Hexa(2-ethyl-1-butoxy) disiloxane (94%) | 621 | 9.40 | 3.41 | 0.62 |
| Blend | 1,816 | 27.5 | 9.68 | 0.39 |

In the above table, the test results show that satisfactory silicone-thickened silicate blend hydraulic fluids are obtained by using much less silicone of a desirably low viscosity type in combination with hexaalkoxy disiloxane. A similar silicone-thickened silicate blend based on tetraalkyl silicate by comparison required a considerably larger amount of much more viscous silicone to provide a satisfactory hydraulic fluid.

Although the compositions described in the foregoing examples possess those properties, such as anti-wear, viscosity, viscosity index, lubricity, thermal and oxidative stability, etc., to a degree satisfactory to render them useful as hydraulic fluids meeting the most stringent requirements, it will be obvious to those skilled in the art that additives, such as anti-wear and anti-rust agents, oxidation and corrosion inhibitors, etc., may be incorporated in the blends to improve one or more properties thereof. Other known fluids having recognized desirable properties may also be employed in the blends such as, for example, synthetic oils of the diester type (di-2-ethylhexyl sebacate). Similarly, it will occur to those skilled in the art that the properties of the herein-described compositions are such as to render them useful in applications other than as power transmission fluids. For example, the fluids contemplated by the invention may be used as lubricants for special purposes, such as in the lubrication of machine guns, aircraft instruments, etc.

We claim:

1. A composition for use as a power transmission fluid which consists essentially of a total of from about 85 to 97% by weight of alkyl silicate selected from the group consisting of hexaalkoxy disilicates and mixtures of polyalkoxy polysiloxanes and alkyl silicates containing at least 60% by weight of hexaalkoxy disiloxane, said alkyl silicates and polyalkoxy polysiloxanes having the general formula

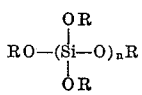

where $n$ is an integer having a value of 1, 2 and higher depending on the particular polyalkoxy polysiloxane, alkyl silicate and mixtures thereof as described above, and where the R's represent branched-chain alkyl groups of from 5 to 8 carbon atoms each, together with a total of from about 3 to 15% by weight of a silicone polymer having the general formula

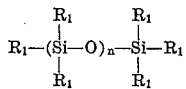

where $n$ is an integer having a value of at least one and wherein the $R_1$'s are lower alkyl radicals of from 1 to 5 carbon atoms each, said silicone polymer having a viscosity of between about 1,000 and 2,500,000 cs. at 77° F.

2. The composition of claim 1 wherein the R's of the polyalkoxy polysiloxane, alkyl silicate and mixtures thereof are alkyl groups of from 5 to 8 carbon atoms each which are branched in the 2-position.

3. A composition for use as a power transmission fluid which consists essentially of a total of from about 85 to 97% by weight of hexaalkoxy disiloxane having the general formula

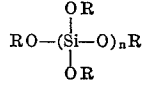

where $n$ is an integer having a value of 2, and where the R's represent branched-chain alkyl groups of from 5 to 8 carbon atoms each, together with a total of from about 3 to 15% by weight of a silicone polymer having the general formula

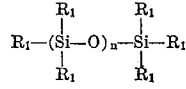

where $n$ is an integer having a value of at least one and wherein the $R_1$'s are lower alkyl radicals of from 1 to 5 carbon atoms each, said silicone polymer having a viscosity of between about 60,000 and 2,500,000 cs. at 77° F.

4. A composition for use as a power transmission fluid which consists essentially of from about 85 to 97% by weight of hexa(2-methyl-1-butoxy) disiloxane, together with from about 3 to 15% by weight of a dimethyl silicone having a viscosity between 6,000 and 2,500,000 cs. at 77° F.

5. A composition for use as a power transmission fluid which consists essentially of from about 85 to 97% by weight of hexa(2-ethyl-1-butoxy) disiloxane, together with from about 3 to 15% by weight of a methylethyl silicone having a viscosity between 60,000 and 2,500,000 cs. at 77° F.

6. A composition for use as a power transmission fluid which consists essentially of from about 85 to 97% by weight of hexa(2-ethylhexoxy)disiloxane together with from about 3 to 15% by weight of a methyl ethyl silicone having a viscosity between 60,000 and 2,500,000 cs. at 77° F.

7. A composition for use as a power transmission fluid which consists essentially of from about 85 to 97% by weight of a predominantly hexaalkoxy disiloxane mixture of alkyl silicates and polyalkoxy polysiloxanes having the composition

| | Percent by weight |
|---|---|
| Tetra(2-ethylbutoxy)ortho-silicate | 5 |
| Hexa(2-ethylbutoxy)disiloxane | 70 |
| Octa(2-ethylbutoxy)trisiloxane | 10 |
| Higher boiling polyalkoxy polysiloxanes | 15 | together with from about 3 to 15% by weight of a methylethyl silicone having a viscosity between 60,000 and 2,500,000 cs. at 77° F.

References Cited in the file of this patent
UNITED STATES PATENTS

| 2,495,363 | Barry et al. | Jan. 24, 1950 |
| 2,530,769 | Hollis | Nov. 21, 1950 |
| 2,643,263 | Morgan | June 23, 1953 |
| 2,681,313 | Kather et al. | June 15, 1954 |
| 2,746,926 | Barry | May 22, 1956 |

UNITED STATES PATENT OFFICE
CERTIFICATION OF CORRECTION

Patent No. 2,960,474                          November 15, 1960

Neal W. Furby et al.

It is hereby certified that error appears in the above numbered patent requiring correction and that the said Letters Patent should read as corrected below.

Column 6, line 74, for "6,000" read -- 60,000 --.

Signed and sealed this 30th day of May 1961.

(SEAL)
Attest:

ERNEST W. SWIDER
Attesting Officer

DAVID L. LADD
Commissioner of Patents